United States Patent [19]
Henoch et al.

[11] Patent Number: 5,355,521
[45] Date of Patent: Oct. 11, 1994

[54] METHOD FOR CONTACTLESS TRANSMISSION OF INFORMATION USING TWO CARRIER WAVES AND AN INTERMEDIATE SIDE BAND ON THE CARRIER WAVES

[75] Inventors: Bengt Henoch, Backvindeln 90, S-126 57 Hägersten; Eilert Berglind, Täby, both of Sweden

[73] Assignee: Bengt Henoch, Hägersten, Sweden

[21] Appl. No.: 834,272

[22] PCT Filed: Aug. 15, 1990

[86] PCT No.: PCT/SE90/00526
§ 371 Date: Feb. 18, 1992
§ 102(e) Date: Feb. 18, 1992

[87] PCT Pub. No.: WO91/03109
PCT Pub. Date: Mar. 7, 1991

[30] Foreign Application Priority Data
Aug. 23, 1989 [SE] Sweden .................. 8902808

[51] Int. Cl.[5] .................. H04B 1/59
[52] U.S. Cl. .................. 455/59; 455/88; 455/92; 455/103; 340/825.54; 342/51
[58] Field of Search .................. 455/89, 92, 103, 104, 455/106, 84, 85, 86, 88, 59; 340/825.72, 825.73, 825.74, 825.54; 342/44, 51; 375/37, 38

[56] References Cited
U.S. PATENT DOCUMENTS
| | | | |
|---|---|---|---|
| 4,075,632 | 2/1978 | Baldwin et al. | 455/92 X |
| 4,896,371 | 1/1990 | Kahn | 455/103 X |
| 5,128,669 | 7/1992 | Dadds et al. | 455/89 X |

FOREIGN PATENT DOCUMENTS
| | | |
|---|---|---|
| 459775 | 7/1989 | Sweden . |
| 2202108 | 9/1988 | United Kingdom . |

Primary Examiner—Edward F. Urban
Attorney, Agent, or Firm—Nies, Kurz, Bergert & Tamburro

[57] ABSTRACT

A method for the contactless transmission of information between a transmitter/receiver unit and a transponder. The transmitter/receiver unit is caused to transmit a first and a second carrier wave which have mutually different frequencies (f1, f2), forming the difference frequency, of the two different frequencies, in the transponder, dividing the third signal, (the difference frequence) (f3) to a fourth signal (f4) having half the difference frequency, causing the fourth signal to modulate the two carrier waves received in the transponder as a result of being applied to a diode or like device, so that the received carrier waves are reflected back from the transponder to the transmitter/receiver unit, mixing the signal received back in the transmitter/receiver unit with one of the first or the second carrier wave frequencies, and bringing forward each of the two sidebands on respective sides of the carrier wave frequency with which mixing is effected, such sidebands differing from the last mentioned carrier wave frequency by a frequency which is equal to half the difference frequency (f4), that sideband of the sidebands which has a frequency that lies between the carrier wave frequencies is a combined or combination sideband which is caused to have an amplitude that differs from the amplitude of the other sideband, and the pair of sidebands then being filtered and the information content of the sidebands being detected in the detecting circuit of the transmitter/receiver unit.

7 Claims, 1 Drawing Sheet

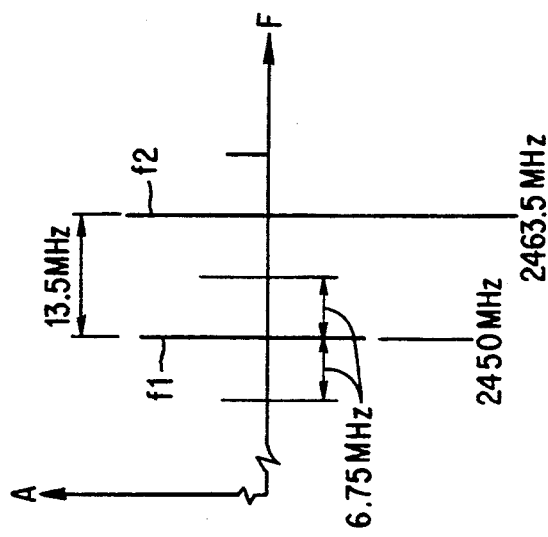
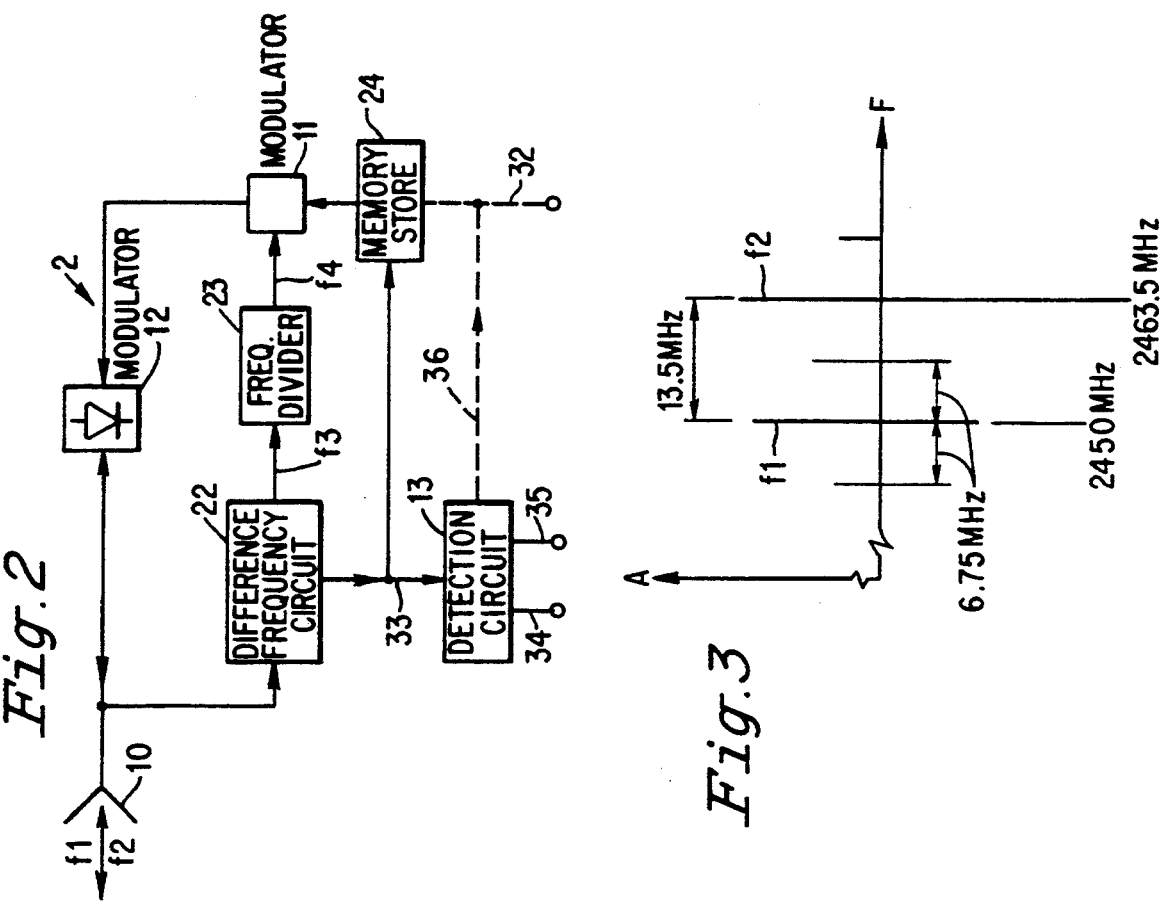
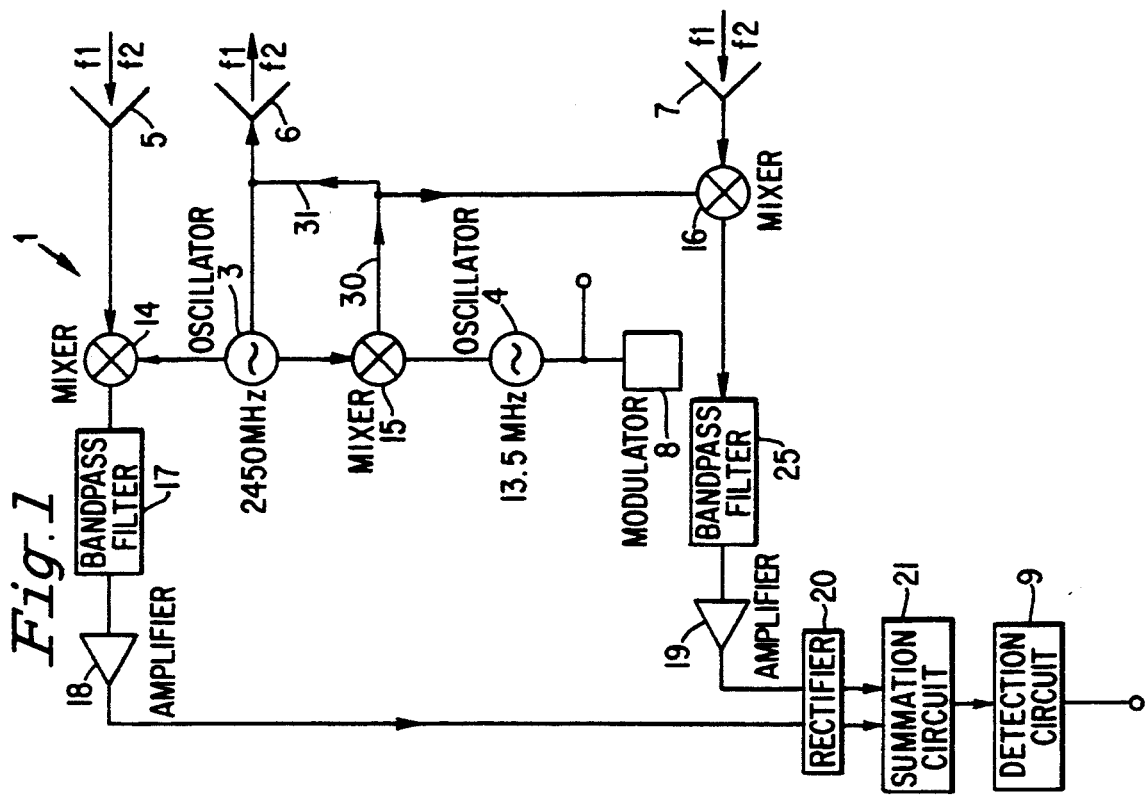

METHOD FOR CONTACTLESS TRANSMISSION OF INFORMATION USING TWO CARRIER WAVES AND AN INTERMEDIATE SIDE BAND ON THE CARRIER WAVES

FIELD OF THE INVENTION

The present invention relates to a method for the contactless transmission of information.

BACKGROUND OF THE INVENTION

The Swedish Patent Specification No. (Swedish Patent Application 8802230-6), having a corresponding U.S. Pat. No. 5,251,235, describes apparatus for the contactless transmission of information over a serial twin-cable data bus, comprising a clock line and a data line connected to a transmitter, a receiver and a demodulator. The transmitter includes an oscillator and a modulator which is intended to modulate the signal generated by the oscillator in response to the clock line signals and data line signals respectively. The invention defined in said Patent Specification is characterized in that the modulator is constructed to carry out on the signal generated by the oscillator two significantly separated modulation steps which do not coincide in time, therewith to form two mutually independent signal channels, of which a first is intended for data signals and the other is intended for the clock signals. The demodulator is constructed to demodulate signals which are received by the receiver and which have been modulated in the aforesaid manner and also to recreate said two signals. The demodulator has a clock-line output and a data-line output.

The aforesaid Patent Specification defines a method of separating data and clock lines, by using pauses in transmission as information carriers, wherewith, e.g., switching or marking of levels in the clock line triggers a first modulation step, which constitutes a short transmission pause, whereas switching or marking of levels in the data line triggers a second modulation step which constitutes two rapid, sequential transmission pauses.

SUMMARY OF THE INVENTION

The present invention provides a novel and useful method for application in such data buses or other data links, such as to enable the signals transmitted from the master side to be used as control oscillators on the slave side, and therewith to enable the slave side to transmit signals which are received on the master side without the signals transmitted from said master side disturbing the reception of the signals, transmitted from the slave side and without the occurrence of zero settings, or so-called nodes, in the signal from the slave side.

The present invention thus relates to a method for the contactless transmission of information between a transmitter/receiver unit and a transponder, the transmitter/receiver unit comprising oscillators, transmitter and receiver antennas, a modulator and a detection circuit, and the transponder including a transmitter/receiver antenna, a modulator and a detection circuit. The invention is characterized in that the transmitter/receiver unit is caused to transmit a first and a second carrier wave which have mutually different frequencies (f1, f2); in that the difference frequency is formed in the transponder; in that a third signal having the difference frequence (f3) is caused to be divided to a fourth signal having half the difference frequency (f4); in that the fourth signal is caused to modulate the two carrier waves received in the transponder by being applied to a diode or like device, such that the received carrier waves are reflected back to the transmitter/receiver unit; in that the signal received in the transmitter/receiver unit is mixed down with one of the first or the second carrier wave frequencies; and in that each of the two sidebands on respective sides of the carrier wave frequency with which said mixing is effected are brought forward, said sidebands differing from the last mentioned carrier wave frequency by a frequency which is equal to half the difference frequency (f4), wherein that sideband of said sidebands which has a frequency that lies between the carrier wave frequencies is a combined sideband which is caused to have an amplitude which differs from the amplitude of the other sideband, and wherein the pair of sidebands are filtered and the information content of the sidebands detected in the detecting circuit of the transmitter/receiver unit.

BRIEF DESCRIPTION OF THE DRAWINGS

The invention will now be described in more detail with reference to exemplifying embodiments thereof illustrated in the accompanying drawing, in which FIG. 1 illustrates a transmitter/receiver unit;
FIG. 2 illustrates a transponder; and
FIG. 3 illustrates a frequency diagram.

DESCRIPTION OF THE INVENTION

It will be evident from the following that the present invention can be applied in the most widely varying two-directional information links. It will also be understood that the invention is not restricted to the illustrated embodiment of apparatus and that said embodiment shall be seen solely as a means of explaining the inventive method.

It is assumed in the illustrative embodiment that the link or the bus operate at microwave frequencies, although the invention is not restricted to these frequency bands, but can be applied at other frequency bands.

FIGS. 1 and 2 illustrate schematically a transmitter/receiver unit 1, hereinafter called the transmitter, and a transponder 2. These units 1, 2 form a link by means of which information, e.g. data, can be transmitted in both directions. The transmitter 1 includes, among other things, oscillators 3, 4, transmitter and receiver antennas 5, 6, 7, a modulator 8, and a detection circuit 9. The transponder 2 includes, among other things, a transmitter/receiver antenna 10, a modulator 11, 12 and a detection circuit 13.

The transmitter 1 also includes mixers 14–16, bandpass filters 17, 25, amplifiers 18, 19, a rectifier 20 and a summation circuit 21. The transponder 2 further includes a circuit 22 which is intended to form the difference frequency between two frequencies, and a frequency divider 23. Depending on the field of use, the transponder may also include a memory store 24, which may be constructed to deliver information and also to receive information and to store the information received.

According to the present invention, the transmitter is caused to transmit a first and a second carrier wave of mutually different frequencies (f1, f2). This is illustrated in FIG. 1, in that the oscillator 3 is shown to generate a signal having a frequency of 2450 MHz, which is sent to the antenna 6. The signal is also sent to a mixer 15, to which there is also applied a signal from a further oscillator 4, which in the illustrated case generates the frequency 13.5 MHz. The mixer 15 is constructed so that a signal having the frequency 2463.5 MHz will appear on its output when the oscillator 4 is activated by the modulator 8. This signal is sent along the lines 30-31 to the antenna 6. Thus, a first and a second signal in the form of two carrier waves are transmitted by means of the antenna 6.

This transmitted signal is received in the transponder 2 on the antenna 10. As before mentioned, the transponder includes a circuit 22 which is intended to form the difference frequency between the two carrier wave frequencies. Thus, there is formed in the transponder 2 a third signal which has the difference frequency formed in the circuit 22.

The frequency divider 23 in the transponder is operative to divide the third signal having the difference frequency (f3) into a fourth signal of half the difference frequency (f4).

The fourth signal is caused to modulate the two carrier waves received in the transponder, by being applied to a diode or like device in the modulator 12, so that the received carrier waves will be reflected back via transponder antenna 10 to the transmitter 1, without supplying further energy to the carrier waves.

The modulator in the transponder also includes a circuit 11 which is operative to start and stop the modulation step in accordance with the information to be transmitted from the transponder 2 to the receiver 1. This information can be delivered to the circuit 11 from a memory store 24, or alternatively from a data line 32. Thus, the two carrier waves are transmitted from the transponder, each modulated with a frequency f4 which is equal to half the difference frequency between the carrier wave frequencies.

According to the inventive method, the signal received on the antenna 5 of the transmitter 1 is mixed with the frequency of the first or the second carrier waves in a mixer 14 intended therefor. The two sidebands on respective sides of the carrier wave frequency with which said mixing is effected is the output signal from the mixer 14. These two sidebands differ from the last mentioned carrier wave frequency by a frequency which is equal to half the difference frequency (f4).

FIG. 3 illustrates a frequency diagram in which the transmitted carrier waves have been designated f1 and f2 respectively. If mixing-down in the modulator 14 is effected with the frequency 2450 MHz, the sidebands whose frequencies differ from 2450 MHz by 6.75 MHz will therefore lie downstream of the mixer 14.

However, the other carrier wave in the transponder having half the difference frequency is also modulated, and consequently this carrier wave with associated pair of corresponding sidebands will be received in the receiver. One of these last mentioned sidebands has a frequency which is 6.75 MHz higher than the frequency of the other carrier wave, a frequency of 2463.5 MHz, and the other of said sidebands has a frequency which is 6.75 MHz lower than 2463.5 MHz.

Because modulation is effected in the transponder with half the difference frequency, that particular sideband of the occurring sidebands which has a frequency centrally between the carrier wave frequencies will be a combined or combination sideband.

According to the invention, the combined sideband is given an amplitude which differs from the amplitude of the other, filtered sideband, as illustrated in FIG. 3. According to the invention, the combined sideband and said other sideband are filtered-out with the aid of the bandpass filter 17.

Two methods and combinations therebetween can be employed to ensure that the combined sideband will have an amplitude which differs from the other sideband.

One method is to permit the carrier waves to have a sufficiently large amplitude difference, for example a difference factor of at least about 2.

Another method is to permit the carrier waves to have the same amplitude but to cause the signal which modulates the carrier waves in the transponder to have a phase which is different to the phase of that signal which is frequency-halved and mixed-down in the transponder, i.e. the aforesaid fourth signal.

By combinations of these methods is meant that both amplitudes and phases can be varied, wherewith the amplitude difference between the carrier waves need not longer be in the order of twice the difference.

Irrespective of how amplitudes and phases are selected, it shall be ensured that the three sidebands, namely the two sidebands which form the combined sideband and said other sideband, do not have vectors in an amplitude-phase diagram which give resultants which are equal to zero subsequent to mixing in the transmitter/receiver unit.

The fact that the central sideband has an amplitude which is different to the other sideband of the sideband pair results in that no zero positions, or nodes, can occur in the received signal as a result of interference or disturbance.

The filtered sideband, or pair of sidebands, is detected in the detection circuit 9 of the transmitter with respect to the information content of the sidebands. The circuit 20 is a rectifier.

The signal appearing on the output of the rectifier 20 is therefore a data signal. The clock frequency in the transmitter is 13.5 MHz, and the clock signal can be taken from the oscillator 4, through an output.

The clock signal in the transponder 2 also has a frequency of 13.5 MHz and is taken from the circuit 22 via a line 33, so as to control, inter alia, the infeed and outfeed of data into and from the memory store 24, if a store is included, and to control the modulator 11. Consequently, no oscillator is required in the transponder, either to produce a modulation signal or to produce a control oscillator signal.

The transmitter is also able to transmit information to the transponder. In this case, the modulator 8 is used to control, e.g. the oscillator 4 in a manner such that, e.g., the transmission pause takes place in accordance with what is described in the aforesaid patent specification, i.e. transmission pauses which corresponds to the information to be transmitted to the transponder. It will be understood that the transponder may also operate in accordance with the principle of modulating by means of the transmission pause.

A signal received in the transponder is detected in the transponder detection circuit, where the signal f3 having the difference frequency is supplied to the detection circuit, where, e.g., transmission pauses are detected while the clock frequency in the transponder is the difference frequency, as before mentioned.

One output 34 of the transponder detection circuit 13 may concern data and one output 35 may concern the clock. The transponder may also be so constructed that the information recovered by means of the detection circuit is fed into the memory 24 of the transponder, via a line 36. The reference numeral 32 identifies a further input direct to the memory.

According to one preferred embodiment of the invention, the signal received in the transmitter is also mixed-down with the other of the carrier wave frequencies f2. This is effected in the same manner as that described with reference to the frequency f1. The transmitter herewith includes a further mixer 16 on the output of which there appears a corresponding pair of sidebands which differ mutually with a frequency of 13.5 MHz. The two sidebands, each on respective sides of the carrier wave frequency with which said mixing is effected, are filtered out in a bandpass filter 25, which corresponds to the bandpass filter 17. Subsequent to being amplified in an amplifier 19, the signals are rectified in the circuit 20.

Two receiving channels are formed in this embodiment, namely one receiving channel which includes a pair of sidebands around the first carrier wave and a receiving channel which includes a pair of sidebands around the other carrier wave. Subsequent to rectification in the rectifier 20, the rectified signals are summated in the summation circuit 21. Such a signal is much smoother than when solely one receiving channel is used.

According to another preferred embodiment, the two carrier waves are transmitted at different strengths. As a result, the different sidebands will have different amplitudes, which in turn results in smaller fluctuations in the received signal. According to a further preferred embodiment, the transmitted carrier waves have a microwave frequency, preferably a frequency of 2450 MHz and a frequency of 2450 MHz plus or minus said difference frequency, said difference frequency preferably being 13.5 MHz.

It will be obvious that the present invention affords the advantages recited in the introduction.

In the aforegoing, the inventive method has been described with reference to specific embodiments thereof. It will be understood, however, that the apparatus used may have different constructions, depending on the field of use concerned, and that the same function can be achieved with another detailed solution than that illustrated in the drawing.

The present invention shall not therefore be considered restricted to the illustrated, exemplifying embodiment, since modifications and variations can be made within the scope of the following claims.

We claim:

1. A method for the contactless transmission of information between a transmitter/receiver unit and a transponder, wherein the transmitter/receiver unit includes oscillators, transmitter and receiver antennas and a modulator and detection circuit, and wherein the transponder includes a transmitter/receiver antenna, a modulator and a detection circuit, the method comprising the steps of: generating and transmitting from the transmitter/receiver unit first and second carrier wave signals, which have mutually different frequencies (f1, f2), to the transponder; receiving said first and second carrier wave signals by the transponder; creating a third signal, which is the difference frequency of said first and second carrier waves, in the transponder; dividing the third signal (f3) and thereby creating a fourth signal having half the said difference frequency (f4); modulating the fourth signal with the information received by the transponder; modulating the two carrier waves received in the transponder with the modulated fourth signal by applying the modulated fourth signal and said received first and second carrier wave signals to a diode device, wherein the received carrier waves are reflected back to the transmitter/receiver unit; mixing down the carrier wave signals received back in the transmitter/receiver unit from the transponder, with one of the first and the second original carrier wave frequencies to thereby create a signal comprising one sideband on each of the respective sides of the carrier wave frequency with which said mixing is effected; said sidebands differing from said one of the first and the second original carrier wave frequencies by a frequency which is equal to half the difference frequency (f4), wherein one sideband, of said two sidebands, has a frequency that lies between the said two carrier wave frequencies and is a combined sideband having an amplitude which differs from the amplitude of the other of said two sidebands; filtering both sidebands and detecting the information carried by the sidebands in the detecting circuit of the transmitter/receiver unit.

2. A method according to claim 1, wherein said difference frequency (f3) is utilized as a clock frequency in said transponder.

3. A method according to claim 1, wherein the signals of both the first and the second carrier wave frequencies received back in the transmitter/receiver unit from the transponder are mixed with the other of the first and the second carrier wave frequencies, therewith producing the two sidebands on respective sides of said other carrier wave frequency with which said mixing is effected, these sidebands differing from the said other carrier wave frequency by a frequency which is equal to half the difference frequency (f4), therewith forming two receiving channels in said transmitter/receiver unit.

4. A method according to claim 3, including the further steps of rectifying and summating the two receiving channels each of which include a pair of sidebands around respective carrier wave frequencies.

5. A method according to claim 1, including the step of transmitting the two carrier waves at different strengths.

6. A method according to claim 1, including the steps of forming the difference frequency (f3) in the transmitter/receiver unit, modulating said two carrier waves with this difference frequency, and detecting said third signal having the difference frequency with respect to its information in the detection circuit of the transponder.

7. A method according to claim 1, wherein said two transmitted carrier waves have microwave frequencies, of 2450 MHz and a frequency of 2450 MHz plus or minus said difference frequency respectively, said difference frequency being 13.5 MHz.

* * * * *